UNITED STATES PATENT OFFICE.

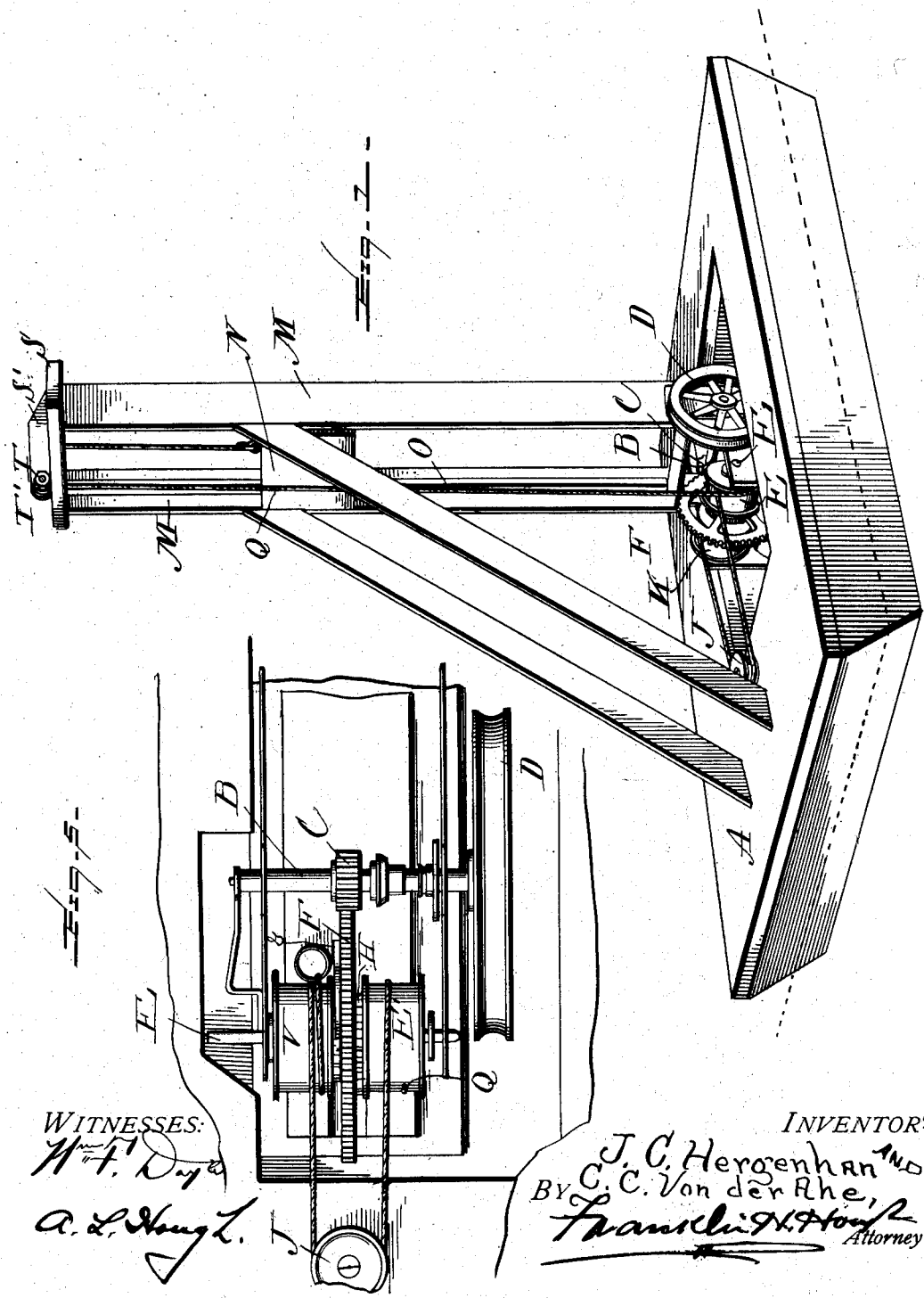

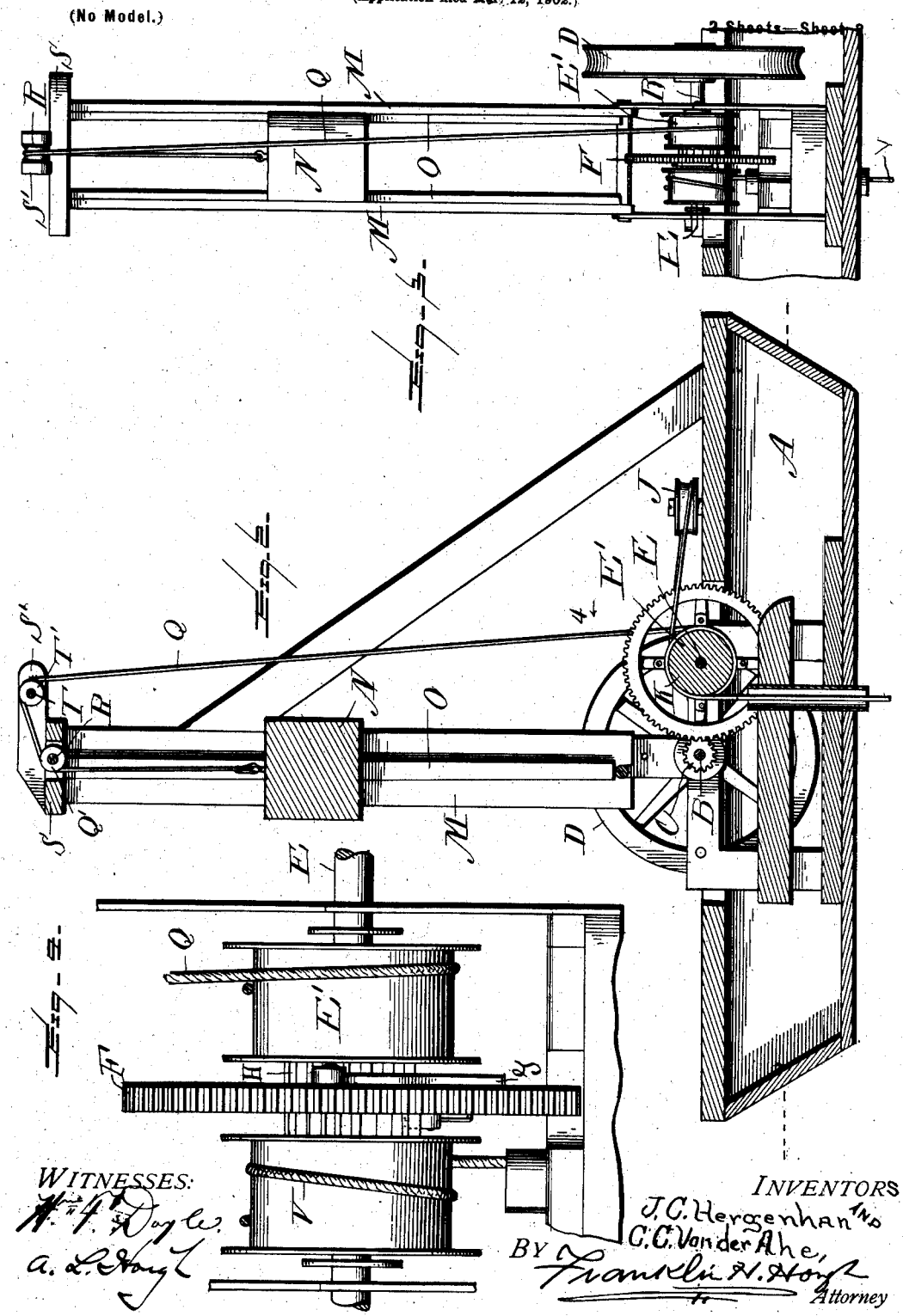

JOHN C. HERGENHAN AND CHARLES C. VON DER AHE, OF NEW YORK, N. Y.

DEVICE FOR UTILIZING WAVE-POWER.

SPECIFICATION forming part of Letters Patent No. 706,558, dated August 12, 1902.

Application filed March 12, 1902. Serial No. 97,935. (No model.)

*To all whom it may concern:*

Be it known that we, JOHN C. HERGENHAN and CHARLES C. VON DER AHE, citizens of the United States, residing at New York city, in the county of New York and State of New York, have invented certain new and useful Improvements in Devices for Utilizing Wave-Power; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tide-motor powers; and it consists in the provision of a float adapted to ride upon the surface of water and carrying mechanism which is adapted to rotate a shaft as the float rises and lowers with the moving surface of the water, said float being anchored to a weight by a cable which passes about suitable winding-drums and connected to a weight which is adapted to be hoisted as the float rises, thus causing the winding-drum to rotate and drive a pulley or balance-wheel on which the power may be transferred at a suitable location.

The invention relates, further, to various details of construction, which will be hereinafter more fully described and then specifically defined in the appended claims.

The invention is illustrated in the accompanying drawings, which, with the letters of reference marked thereon, form a part of this application, and in which drawings—

Figure 1 is a perspective view of the top of the float and the mechanism carried thereon for rotating the wheels. Fig. 2 is a vertical sectional view longitudinally through the float, showing parts of the device in elevation. Fig. 3 is a cross-sectional view showing in elevation parts of the device. Fig. 4 is a detail view showing the winding-drums. Fig. 5 is a top plan view.

Reference now being had to the details of the drawings by letter, A designates a float of any suitable construction, and mounted on a shaft B, journaled in a suitable frame carried by the float, is a gear-wheel C, which rotates with said shaft, and on the end of the shaft is keyed a balance-wheel D, which is grooved. Mounted on a counter-shaft E in said frame is a gear-wheel F, keyed to rotate with said shaft, and on the side of said gear-wheel F is a spring-actuated pawl G, which rotates upon the ratchet-wheel H, which is loosely journaled on the shaft E, said pawl adapted on the forward movement of the gear-wheel F to engage one of the ratchet-teeth and cause said ratchet-wheel to rotate in one direction with the gear-wheel. Mounted on the shaft E is a drum K, which is fastened to rotate with said ratchet-wheel on the shaft E, and loosely journaled on the shaft E is a second winding-drum E'. The teeth of the gear-wheel mounted on the shaft E are in mesh with the teeth of the pinion on the shaft B.

Mounted to have a vertically-movable play between the standards M, mounted on the float, is a weight N, which is preferably grooved on its opposite faces to receive the guide-strips O on the inner faces of said standards. Connected to said weight is a cable Q, which passes over a pulley Q', which is journaled on a stub-shaft R, carried at the upper ends of said standards. Projecting horizontally from the cross-piece S at the tops of the standards are bracket-arms S', carrying a shaft T, on which a pulley T' is journaled, over which said cable passes. Said cable after passing over the pulleys at the upper end of the standard winds about the drum E', which is loosely journaled on the shaft E, and thence passes about a pulley J, which is journaled horizontally on the upper surface of the float. The cable after passing about the pulley J winds about the drum K and passes thence to the anchor, comprising a weight (not shown) which is adapted to rest upon the bed of the stream or the ground underneath the water over which the float is disposed.

The operation of our device will be at once understood and is as follows: The anchor being sunken the cable is adjusted the proper length so that when the float is resting horizontally the weight carried by the float is adjacent to its lowest limit and when the float is raised by the action of the waves the cable becomes taut and is held taut, and the suspended weight is elevated on the upward movement of the float by means of the rope being held taut and anchored at its lower end. This movement of the weight as the float rises will cause the drum K, about which the rope winds, to rotate in a direction to drive the gear-wheel held thereto by the pawl in one direction, and as the float lowers such sliding weight mounted on the standards will fall by gravity, and the drum K will turn idly upon its shaft, and on a succession of rising and lowering motion of the float a continuous rotary or slight intermittent motion will be imparted to the driving-wheel in one direction. The power thus generated may be transmitted from the driving-wheel to any location desired, the essential feature of the invention consisting of the means, as described, for producing a rotary movement to the driving-shaft by means of the mechanism described.

Having thus fully described our invention, what we claim as new, and desire to secure by Letters Patent, is—

1. A tide-motor power comprising a float, a winding-drum and shaft with gear-wheels rotating therewith and mounted upon said float, an anchor, a suspended weight carried by the float, a cable adapted for connection to said anchor, passing about said drum, and over suitable pulleys and suspending said weight, whereby as the float rises said suspended weight will be raised and cause the driving-shaft to be operated, as set forth.

2. A tide-motor power comprising a float, a shaft, a winding-drum loosely journaled on said shaft and mounted upon the float, a ratchet-wheel fastened to rotate with said drum, a gear-wheel keyed to rotate with said shaft, a pawl carried by the gear-wheel and designed to engage said ratchet-wheel, a counter-shaft carried by the float, a pinion-wheel keyed thereto and meshing with said gear-wheel, a cable, adapted for connection at one end to an anchor, and passing about said winding-drum, and pulleys carried by the float, a weight suspended on uprights carried by the float and to which suspended weight said cable is connected, as shown and for the purpose set forth.

3. A tide-motor power comprising in combination with a float, a shaft journaled therein, a pinion-wheel rotating with said shaft, a counter-shaft, a gear-wheel meshing with said pinion, drums on the counter-shaft, a horizontally-mounted pulley on the float, standards on said float provided with guide-strips on their adjacent faces, a suspended weight having grooves on its opposite faces to receive said guide-strips, pulleys at the upper ends of the standards, a cable fastened to said suspended weight passing about said pulleys and drums, and its other end adapted for attachment to an anchor, substantially as shown and described.

In testimony whereof we hereunto affix our signatures in presence of two witnesses.

J. C. HERGENHAN.
CHAS. C. VON DER AHE.

Witnesses:
GEORGE BATE,
ARTHUR L. WINKLER.